United States Patent
Toyoda

(10) Patent No.: US 7,234,446 B2
(45) Date of Patent: Jun. 26, 2007

(54) MISFIRE DETECTOR FOR MULTI-CYLINDER ENGINE

(75) Inventor: Katsuhiko Toyoda, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 11/289,111

(22) Filed: Nov. 29, 2005

(65) Prior Publication Data

US 2006/0112932 A1    Jun. 1, 2006

(30) Foreign Application Priority Data

Nov. 30, 2004    (JP)    .............................. 2004-346391

(51) Int. Cl.
*F02P 5/15*    (2006.01)
*F02D 41/14*    (2006.01)

(52) U.S. Cl. ........................ 123/406.14; 123/406.47; 123/481; 123/674; 123/687

(58) Field of Classification Search ........... 123/406.14, 123/406.47, 481, 673–675, 683, 687
See application file for complete search history.

(56) References Cited

U.S. PATENT DOCUMENTS 4,979,481 A * 12/1990 Shimomura et al. ........ 123/481

FOREIGN PATENT DOCUMENTS

| JP | 05-010180 | 1/1993 |
|----|-----------|--------|
| JP | 09-217642 | 8/1997 |
| JP | 2000-265893 | 9/2000 |
| JP | 2002-138894 | 5/2002 |

\* cited by examiner

*Primary Examiner*—T. M. Argenbright
(74) *Attorney, Agent, or Firm*—Flynn, Thiel, Boutell & Tanis, P.C.

(57) ABSTRACT

A misfire detector prevents catalysts from being heated to damaging high temperatures. The misfire detector for a multi-cylinder engine includes a fuel cut control to stop supplying fuel to misfiring cylinders, a control to prevent a fuel feed back control and a fuel learning control and to initialize the correction values of both the fuel feed back control and the fuel learning control, and a retard control to retard the ignition timing based on the extent that misfire occurs or the air-fuel ratio. The retard control can be replaced by a throttle opening control for misfire to limit the throttle opening angle. The retard control can also be replaced by an engine or vehicle speed control to limit the engine or vehicle speed below a predetermined engine or vehicle speed, respectively, irrespective of the throttle position.

4 Claims, 11 Drawing Sheets

MISFIRE RATIO DETERMINATION VALUE (A%) BY WHICH CATALYST MAY BE DAMAGED

FUEL-CUT CANCEL CONDITION WHEN MISFIRE IS DETERMINED (Treset)

*FUEL-CUT IS CNCELED WHEN TIME Treset HAS ELAPSED FROM START OF FUEL CUT DURING MISFIRE AND WHEN THE DRIVING IN EACH SECTION CONTINUED FOR MORE THAN 60 SEC CONDITION FOR THROTTLE OPENING WHEN MISFIRE IS DETERMINED (THgard)

THROTTLE OPENING FOR MISFIRE IS LIMITED AS FOLLOWS

MISFIRE DETECTOR FOR MULTI-CYLINDER ENGINE

FIELD OF THE INVENTION

This invention relates to misfire detectors for a multi-cylinder engine, and more particularly to a misfire detector for the multi-cylinder engine to prevent a catalyst from being heated to high temperatures and avoid detriment or damage of the catalyst.

BACKGROUND OF THE INVENTION

In an engine mounted on a vehicle, there may be caused misfires due to unstable combustion of the fuel in a combustion chamber due to various factors such as lean mixture of the air-fuel ratio by driving under lean combustion, a malfunction of ignition systems or fuel systems, and a failure of components of the engine. When misfire of the engine occurs, unburned gas flows to the catalyst in the exhaust system and burns which causes a rise in catalyst temperature that detriments the performance or damages the catalyst. For this reason, some engines are provided with misfire detectors to detect the misfire and control the fuel.

Examples of prior detectors are disclosed in the following references: JP Laid-Open No. H05-10180; JP Laid-Open No. H09-217642; JP Laid-Open No. 2000-265893; and JP Laid-Open No. 2002-138894.

In prior misfire detectors for the multi-cylinder engine, "fuel feedback control prevention" and "fuel cut" are chosen based on the rate of misfire so as to protect the catalyst from the high temperature or damage (for example, see JP Laid-Open No. H05-10180).

Also, there is another prior misfire detector for the multi-cylinder engine in which fuel feedback control is stopped based on the misfire rate and the fuel cut, or halt of fuel supply, is performed to protect the catalyst, and the driver is informed of short of fuel due to the misfire so as to reduce cost for repair (for example, see JP Laid-Open No. 2002-138894).

Further, there is fuel control while the fuel cut is performed to protect the catalyst.

Here, control of the prior misfire detector for the multi-cylinder engine is explained below. Referring to FIG. 13, a control program for the misfire detector for the multi-cylinder engine starts in step 502. Rate of misfire is calculated for each cylinder in step 504. Then a determination is made in step 506 as to whether the rate of misfire is more than or equal to a criteria A by which to judge whether the catalyst may be damaged.

Rate of misfire is calculated for every 200 engine revolutions for each cylinder, including the cylinder for which the fuel cut is performed due to the misfire. For a V-type engine, the rate of misfire is calculated for each cylinder bank. The rate of misfire is determined from a table depending on the engine speed and the engine load.

The determination is made in step 506 as to whether the misfire rate is more than or equal to the damaging criteria A. In this step, the cylinder for which the fuel cut should be performed (fuel cut cylinder) is determined through a determination process for the fuel cut cylinder as shown in FIG. 14. In order to determine the fuel cut cylinder, a determination program starts in step 602. In step 604, the misfire rate for each cylinder is calculated by dividing the number of misfires by the number of ignitions (for every 200 revolutions of engine speed). Then a determination is made in step 606 as to whether the rate of misfire is more than or equal to the damaging misfire criteria A. Further, another determination is made in step 608 as to whether the number of misfires for each cylinder $SIKCYL_i$ (wherein i is a cylinder number) is greater than a set rate B (e.g. 30%) of the number of misfires of all cylinders for every 200 revolutions of engine speed.

If both of the determinations in steps 606 and 608 are "YES", then the misfire cylinder is determined in step 610 and the determination process ends in step 612. If either the determination in step 606 or 608 is "NO", then the process returns to step 604.

If the misfire cylinder is determined and the determination in step 506 is "YES", a fuel feed back control (F/B) for the fuel cut cylinder is halted and is initialized in step 508. In this initialization of the fuel feed back control, the correction value is set at zero or a default value.

Then, in step 510 a learning control to learn the quantity of fuel feed back for the cylinder for which the fuel cut should be performed is prevented. The correction value of learning is initialized to an unlearned state in step 512. In this initialization of the learning control correction value, the correction value is set at zero or a default value. Also, the learning control is set at the initial state as in the state at start of the engine or the state at which a battery is changed.

Then the fuel cut for the misfire cylinder is performed in step 514. Increase in the fuel supply to the cylinders for which the fuel cut is not performed is prevented in step 516, and the process returns to step 504. In this fuel increase prevention process, the fuel increases for acceleration, enrichment, and other conditions are prevented.

In the calculation of the misfire rate after the implement of the fuel cut for the misfire cylinder in step 514, the calculation of the misfire rate in step 504 includes the cylinder for which the fuel cut is performed, and a determination is made in step 506 as to whether the calculated misfire rate is more than or equal to the criteria A by which to judge whether the catalyst may be damaged.

If the determination in step 506 is "YES", the processes in steps 508–516 are performed. In contrast, if the determination in step 506 is "NO", the effect of the misfire on the catalyst is not significant, so that the fuel cut for the misfire cylinder is canceled in step 518, the fuel feed back control is resumed in step 520, the learning control is resumed in step 522, the fuel increase control prevention is canceled in step 524, and the process returns to step 504.

At this time, the process in step 518 to cancel the fuel cut for the misfire cylinder may be replaced by a condition based on set engine speed and set engine load, instead of the damaging criteria A (FIG. 5).

According to the above-mentioned prior control, the fuel cut control, the fuel feed back prevention control, the fuel learning prevention control, and the fuel increase prevention control are performed when misfire occurs to prevent a rise in the catalyst temperature. However, the air-fuel (A/F) ratio becomes lean and results in undesirable engine knocking, as shown in a time chart in FIG. 15. At this time, no ignition timing control is performed to prevent the knocking.

Moreover, even if the fuel cut control, the fuel feed back prevention control, the fuel learning prevention control, and the fuel increase prevention control are performed when the misfire occurs, the vehicle speed can be increased by depressing a throttle pedal in case the misfire frequency is low or the engine has a large piston displacement. This results in not only a bad influence on the engine and the catalyst but also emission of the exhaust gas in a large amount in the ambient, since the normal appropriate control for exhaust gas is not performed.

SUMMARY OF THE INVENTION

In order to obviate or at least minimize the above inconveniences, the present invention provides a misfire detector for a multi-cylinder engine having a misfire detecting means to detect the misfire for each cylinder, and performs a misfire control if the frequency of the misfire detected by the misfire detecting means is more than a predetermined value. The misfire control includes (1) a fuel cut control for misfiring cylinders having a fuel cut means to stop supplying the fuel to the misfiring cylinders, (2) a control to prevent a fuel feed back control and a fuel learning control and to initialize the correction values of both the fuel feed back control and the fuel learning control, and (3) a retard control to retard the ignition timing by a retard quantity set based on the extent the misfire occurs or the air-fuel ratio.

Also, in a misfire detector for a multi-cylinder engine having a misfire detecting means to detect the misfire for each cylinder, and performing a misfire control if the frequency of the misfire detected by the misfire detecting means is more than a predetermined value. The misfire control includes (1) a fuel cut control for misfiring cylinders having a fuel cut means to stop supplying the fuel to the misfiring cylinders, (2) a control to prevent a fuel feed back control and a fuel learning control and to initialize the correction values of both the fuel feed back control and the fuel learning control, and (3) a throttle opening control for misfire to limit the throttle opening angle as compared to a normal throttle opening angle, in accordance with an acceleration degree.

Further, in a misfire detector for a multi-cylinder engine having a misfire detecting means to detect the misfire for each cylinder, and performing a misfire control if the frequency of the misfire detected by the misfire detecting means is more than a predetermined value, the misfire control includes (1) a fuel cut control for misfire cylinders by a fuel cut means to stop supplying the fuel to the misfire cylinders, (2) a control to prevent a fuel feed back control and a fuel learning control and to initialize the correction values of both the fuel feed back control and the fuel learning control, and (3) an engine speed control to limit the engine speed below a predetermined engine speed irrespective of the opening degree of the throttle.

Furthermore, in a misfire detector for a multi-cylinder engine having a misfire detecting means to detect misfire for each cylinder, and performing a misfire control if the frequency of the misfire detected by the misfire detecting means is more than a predetermined value, the misfire control includes (1) a fuel cut control for misfiring cylinders by a fuel cut means to stop supplying the fuel to the misfiring cylinders, (2) a control to prevent a fuel feed back control and a fuel learning control and to initialize the correction values of both the fuel feed back control and the fuel learning control, and (3) a vehicle speed control to limit the vehicle speed below a predetermined speed irrespective of the opening degree of the throttle.

According to the present invention, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfire cylinders by the fuel cut means to stop supplying the fuel to the misfiring cylinders, (2) the control to prevent the fuel feed back control and the fuel learning control and to initialize the correction values of both the fuel feed back control and the fuel learning control, and (3) the retard control to retard the ignition timing by the retard quantity set based on the extent the misfire occurs or the air-fuel ratio. Accordingly, the catalyst is not heated to high temperatures, which prevents detriment or damage of the catalyst.

Also, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfire cylinders by the fuel cut means to stop supplying the fuel to the misfiring cylinders, (2) the control to prevent the fuel feed back control and the fuel learning control and to initialize the correction values of both the fuel feed back control and the fuel learning control, and (3) the throttle opening control for misfire to limit the throttle opening angle as compared to the normal opening in accordance with the acceleration degree. Accordingly, when the misfire is detected, a rise is avoided in the catalyst temperature owing to the driving at high speed under heavy engine load in a situation where the driver depresses an acceleration pedal when he feels power down due to the misfires. This prevents detriment or damage of the catalyst.

Further, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfire cylinders by the fuel cut means to stop supplying the fuel to the misfiring cylinders, (2) a control to prevent the fuel feed back control and the fuel learning control and to initialize the correction values of both the fuel feed back control and the fuel learning control, and (3) the engine speed control to limit the engine speed below the predetermined engine speed irrespective of the opening degree of the throttle. Accordingly, when the misfire is detected, a rise is avoided in the catalyst temperature owing to driving at high speed under heavy engine load in a situation where the driver depresses the acceleration pedal when he feels power down due to the misfires. This prevents detriment or damage of the catalyst.

Furthermore, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the vehicle speed control to limit the engine speed below the predetermined speed irrespective of the opening degree of the throttle. Accordingly, when misfire is detected, the driver is prevented from driving at high speed which is contrary to the misfire control for avoiding problems resulting from the misfires. Thereby, the catalyst is not heated to high temperatures, which prevents detriment or damage of the catalyst.

According to the present invention, when the misfire control is performed, executed are (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the retard control to retard the ignition timing by the retard quantity set based on the extent the misfire occurs or the air-fuel ratio. Thereby, the catalyst is not heated to high temperatures, which prevents detriment or damage of the catalyst.

Also, when the misfire control is performed, executed are (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the throttle opening control for misfire to limit the throttle opening angle as compared to the normal opening in accordance with the acceleration degree. Accordingly, when misfire is detected, a rise is avoided in the catalyst temperature owing to the driving at high speed under heavy engine load in a situation where the driver depresses the acceleration pedal when he feels power down due to the misfires. This prevents detriment or damage of the catalyst.

Further, when the misfire control is performed, executed are (1) the fuel cut control for misfiring cylinders by the fuel cut means to stop supplying the fuel to the misfiring cylinders, (2) the control to prevent the fuel feed back control and the fuel learning control and to initialize the correction values of both the fuel feed back control and the fuel learning control, and (3) the engine speed control to limit the engine speed below the predetermined engine speed irrespective of the opening degree of the throttle. Accordingly, when misfire is detected, a rise is avoided in the catalyst temperature owing to the driving at high speed under heavy engine load in a situation where the driver depresses the acceleration pedal when he feels power down due to the misfires. This prevents detriment or damage of the catalyst.

Furthermore, when the misfire control is performed, executed are (1) the fuel cut control for misfire cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the vehicle speed control to limit the vehicle speed below the predetermined speed irrespective of the opening degree of the throttle. Accordingly, when misfire is detected, the driver is prevented from driving at high speed which is contrary to the misfire control for avoiding problems due to the misfires. Thereby, the catalyst is not heated to high temperatures, which prevents detriment or damage of the catalyst.

BRIEF DESCRIPTION OF THE DRAWINGS

An embodiment of the present invention will now be described in detail with reference to the drawings.

DETAILED DESCRIPTION

Figure 1:
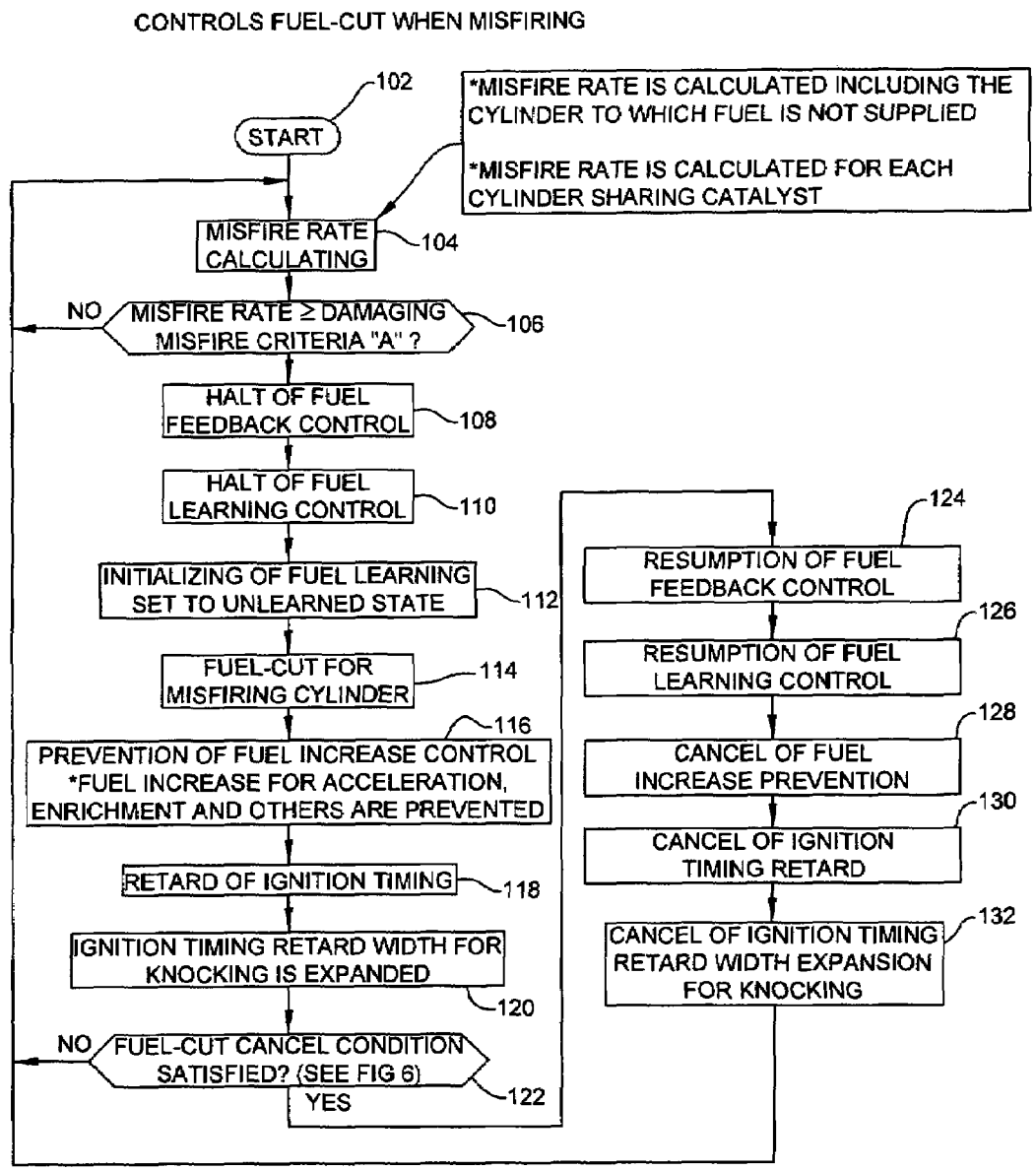
FIG. 1 is a flowchart for the controls when the misfire occurs such as the fuel cut by the misfire detector for the multi-cylinder engine according to the first embodiment of the present invention.
Figure 2:
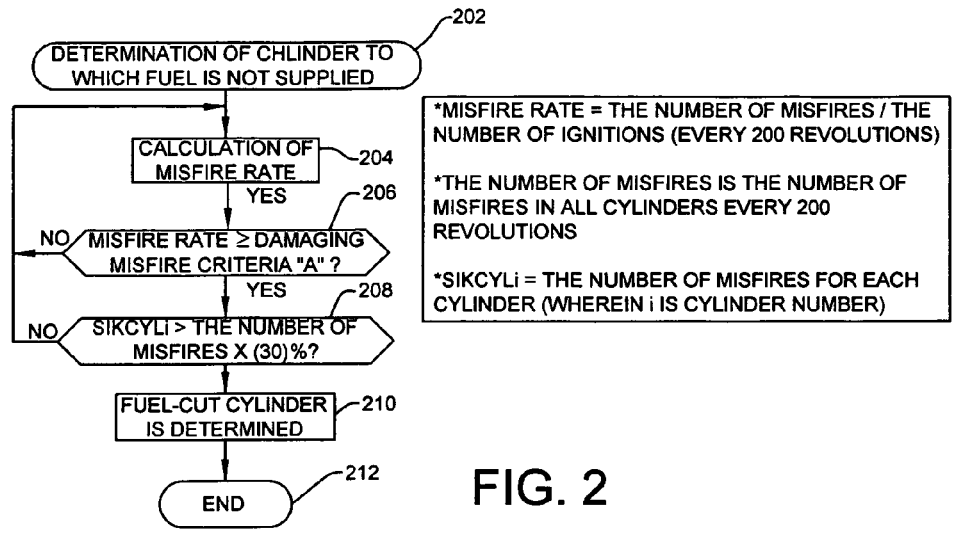
FIG. 2 is a flow chart to determine the cylinder for which the fuel cut should be performed.
Figure 3:
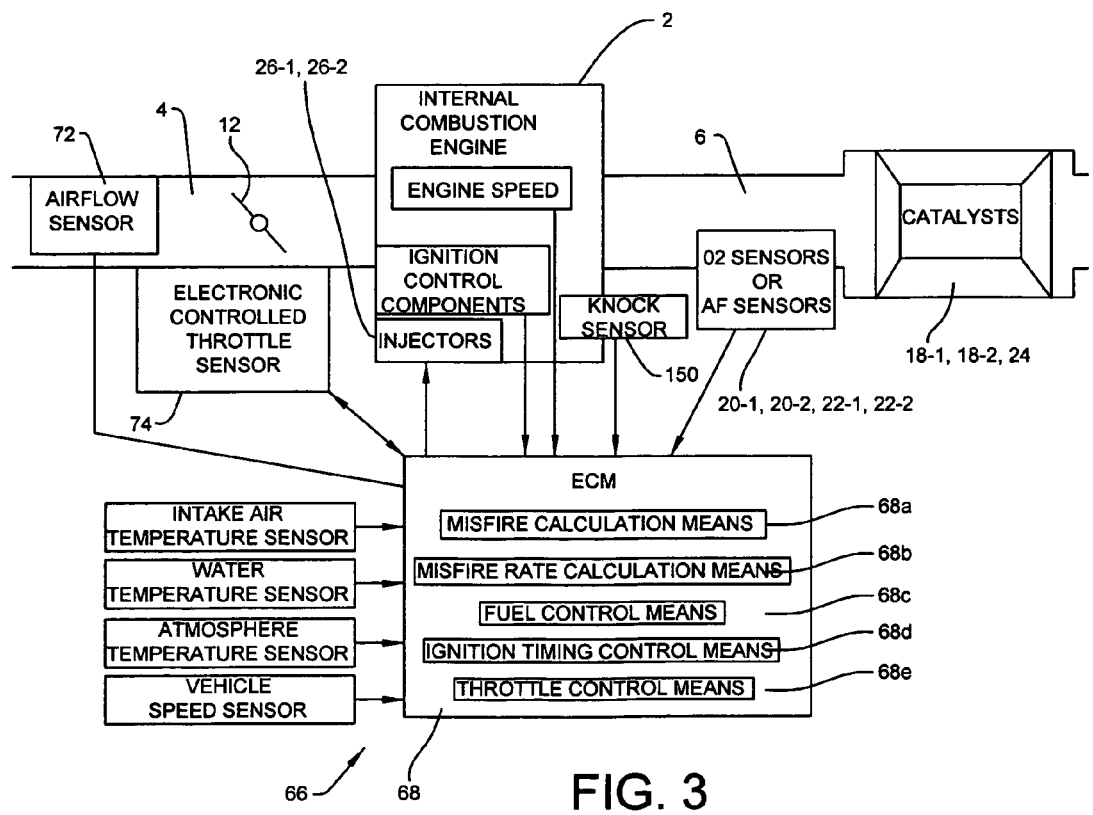
FIG. 3 is a schematic diagram of the misfire detector for the multi-cylinder engine.
Figure 4:
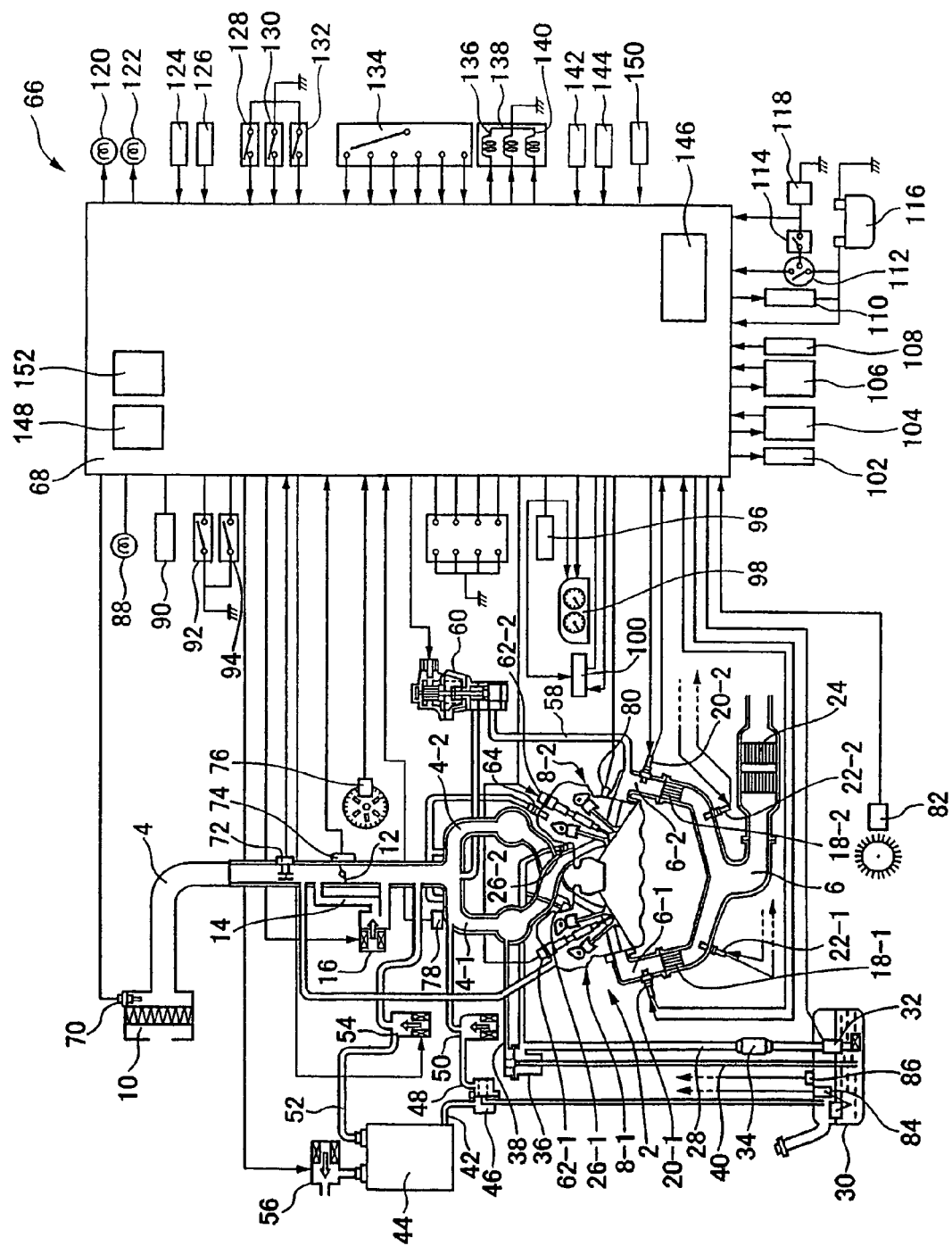
FIG. 4 is a diagram of the system of the misfire detector for the multi-cylinder engine.

FIGS. 1–7 illustrate an embodiment of the present invention. FIGS. 3 and 4 show a multi-cylinder engine (internal combustion engine) 2 mounted on a vehicle (not shown).

Firstly, a system of the multi-cylinder engine 2 is described below. The multi-cylinder engine 2 includes an intake passage 4 and an exhaust passage 6. The engine 2 is a V-type engine, in which a first cylinder bank 8-1 and a second cylinder bank 8-2 are formed in a V-shape.

The intake passage 4 has an air cleaner 10 at an upstream end thereof, a throttle valve 12 in a generally middle portion, and two branched intake passages, i.e., first and second intake branch passages 4-1, 4-2 at a downstream end. The first intake branch passage 4-1 has a downstream end connected to a combustion chamber (not shown) in the first cylinder bank 8-1, while the second intake branch passage 4-2 has a downstream end connected to a combustion chamber (not shown) in the second cylinder bank 8-2.

Also, the intake passage 4 includes a bypass air passage 14 that bypasses the throttle valve 12 to connect the upstream and downstream sides of the intake passage 4. In the bypass air passage 14, an idle control valve 16 is disposed so as to regulate the air flowing through the bypass air passage 14. This idle control valve 16 is connected to a control means 68 mentioned later.

Also, the exhaust passage 6 is divided on an upstream side into two branched passages, i.e., first and second exhaust branch passages 6-1, 6-2. The first exhaust branch passage 6-1 has an upstream end connected to the combustion chamber in the first cylinder bank 8-1, while the second exhaust branch passage 6-2 has an upstream end connected to the combustion chamber in the second cylinder bank 8-2. The first and second exhaust branch passages 6-1, 6-2 are merged at downstream ends.

The first exhaust branch passage 6-1 includes: a first three-way catalyst 18-1 for a first warming-up device; a first front oxygen sensor 20-1 on an upstream side of the first three-way catalyst 18-1; and a first rear oxygen sensor 22-1 on a downstream side of the first three-way catalyst 18-1.

The second exhaust branch passage 6-2 includes: a second three-way catalyst 18-2 for a second warming-up device; a second front oxygen sensor 20-2 on an upstream side of the second three-way catalyst 18-2; and a second rear oxygen sensor 22-2 on a downstream side of the second three-way catalyst 18-2.

The first and second front oxygen sensors 20-1, 20-2 measure the concentration of oxygen in the exhaust gas in the first and second exhaust branch passages 6-1, 6-2 and feed reversed rich and lean signals. Also, the first and second rear oxygen sensors 22-1, 22-2 measure the concentration of oxygen in the exhaust gas in the first and second exhaust branch passage 6-1, 6-2 on the downstream sides of the first and second three-way catalysts 18-1, 18-2, and feed reversed rich and lean signals. The exhaust passage 6 includes a three-way catalyst 24 toward a downstream side from a junction of the first and second exhaust branch passages 6-1, 6-2.

Further, the multi-cylinder engine 2, includes first and second fuel injection valves 26-1, 26-2 facing the combustion chambers in the first and second cylinder banks 8-1, 8-2, respectively. The first and second fuel injection valves 26-1, 26-2 are connected to a fuel tank 30 through a fuel supply passage 28. The fuel in the fuel tank 30 is forced to the fuel supply passage 28 by a fuel pump 32, and is filtered by a fuel filter 34 to remove dust therein, and is supplied to the first and second fuel injection valves 26-1, 26-2.

In the fuel supply passage 28, a fuel pressure regulator 36 is disposed which regulates the pressure of the fuel. This fuel pressure regulator 36 regulates the pressure of the fuel to a predetermined pressure by utilizing the intake pipe pressure that is introduced from a pressure introducing passage 38 in connection with the intake passage 4. Surplus fuel is returned through a fuel return passage 40 to the fuel tank 30.

The fuel tank 30 is connected to a canister 44 through an evaporative passage 42. A tank pressure control valve 46 is disposed on the evaporative passage 42. The tank pressure control valve 46 with an opened or closed solenoid valve 50 regulates the intake pipe pressure introduced through a pressure passage 48 in communication with the intake passage 4. The canister 44 is connected through a purge passage 52 to the intake passage 4 on a downstream side of the throttle valve 12. On the purge passage 52, a purge control valve 54 is disposed. The canister 44 includes an atmosphere valve 56 to regulate the air being introduced.

The multi-cylinder engine 2 includes an EGR passage 58 that connects the second exhaust branch passage 6-2, on an upstream side of the second front oxygen sensor 20-1 forming an exhaust system, with a junction of the first and second intake branch passages 4-1, 4-2 forming an intake system. The EGR passage 58 includes an EGR control valve 60 that regulates the amount of the exhaust gas recirculated to the intake system from the exhaust system.

In addition, the multi-cylinder engine 2 includes first and second ignition coils 62-1, 62-2 to spark an ignition plug (not shown) positioned in each combustion chamber in the first and second cylinder banks 8-1, 8-2. In the second cylinder bank 8-2, a PCV valve 64 is positioned.

A control means 68, forming a misfire detector 66 for the multi-cylinder engine 2, is connected to the idle control valve 16, the first and second front oxygen sensors 20-1, 20-2, the first and second rear oxygen sensors 22-1, 22-2, the first and second fuel injection valves 26-1, 26-2, the fuel pump 32, the purge control valve 54, the EGR control valve 60, and the first and second ignition coils 62-1, 62-2.

The control means 68 is connected to an intake temperature sensor 70 to detect the intake air temperature, an intake air flow sensor 72 to detect the amount of the intake air, a throttle opening sensor 74 to detect opening angle of the throttle, a cam angle sensor 76 to detect the angle of a cam, an intake air pressure sensor 78 to detect the pressure in an intake pipe, a coolant temperature sensor 80 to detect the temperature of a coolant for the multi-cylinder engine 2, a crank angle sensor 82 to detect the angle of a crank of the multi-cylinder engine 2 which also functions as an engine speed sensor, a fuel level sensor 84 to detect the fuel level of the fuel tank 30, and a pressure sensor 86 to detect the pressure in the fuel tank 30.

The control means 68 is also connected to an indication lamp 88, an electric load 90, a power steering pressure switch 92, a heater blower fan switch 94, a vehicle speed sensor 96, a combination meter 98, a cruise control module 100, an A/C condenser fan relay 102, an A/C controller 104, a data link controller 106, an ABS control module 108, a main relay 110, an ignition switch 112, a P/N position switch 114, a battery 116, a starter magnet switch 118, an O/D off lamp 120, a power lamp 122, a light switch 124, a stop lamp switch 126, an O/D cut switch 128, a power/normal change switch 130, a four-wheel-drive low switch 132, a transmission range switch 134, a first solenoid valve 136, a second solenoid valve 138, a TCC solenoid valve 140, an A/T input rotational speed sensor 142, and an A/T output rotational speed sensor 144.

As shown in FIG. 4 showing the misfire detector 66 for the multi-cylinder engine 2, the control means 68 includes an atmosphere pressure sensor 146, a misfire detecting means 148 to detect the misfires in each cylinder of the engine 2 based on the variation of the engine speed and the variation of the pressure in the cylinders, and a misfire control that is executed if the frequency of the misfire detected by the misfire detecting means 148 is greater than a predetermined value.

Here is explained a general structure of the misfire detector 66 of the multi-cylinder engine 2. As shown in FIG. 3, the multi-cylinder engine 2 includes the intake passage 4 and the exhaust passage 6. In the intake passage 4, disposed are the intake airflow sensor 72 that detects the amount of the intake air from the upstream side, and the throttle valve 12. Adjacent the throttle valve 12, the throttle opening angle sensor 74 is disposed as an electric-controlled throttle sensor to detect the opening angle of the throttle.

In the exhaust passage 6, disposed are the catalysts, e.g., the first and second three-way catalysts 18-1, 18-2 for the first and second warming-up devices, and the three-way catalyst 24. Toward the upstream side of the three-way catalysts 18-1, 18-2, 24, disposed is either one of the oxygen sensor (O2 sensor) and the air-fuel ratio sensor, e.g., the first and second front oxygen sensors 20-1, 20-2, and the first and second rear oxygen sensors 22-1, 22-2.

The control means (also referred to as ECU; electronic control unit) 68 of the misfire detector 66 for the multi-cylinder engine 2 includes a misfire calculation means 68a, a misfire rate calculation means 68b, a fuel control means 68c, an ignition timing control means 68d, and the throttle control means 68e. The misfire detecting means 148 thus includes the misfire calculation means 68a, and the misfire rate calculation means 68b. The fuel control means 68c executes fuel cut control by the fuel cut control means 152, fuel feedback control, and fuel learning control, mentioned later.

The control means 68 receives information from the engine 2 on the engine speed and ignition timing components. The control means 68 is connected on an input side to: a knock sensor 150; the intake air flow sensor 72; the throttle opening sensor 74 or the electronic controlled throttle sensor; the sensors such as the first and second front and rear oxygen sensors 20-1, 20-2, 22-1, 22-2; the intake air temperature sensor 70; the coolant temperature sensor 80; the atmosphere pressure sensor 146; and the vehicle speed sensor 96.

The control means 68 is connected on an output side to: the first and second fuel injection valves 26-1, 26-2; and the throttle opening sensor 74 or the electronic controlled throttle sensor.

The misfire detector 66 includes the control means 68 which performs the misfire control, the misfire control including (1) a fuel cut control for misfiring cylinders by having the fuel cut means 152 stop supplying the fuel to the misfiring cylinders, (2) a control to prevent a fuel feed back control and a fuel learning control and to initialize the correction values of both the fuel feed back control and the fuel learning control, and (3) a retard control to retard the ignition timing by a retard quantity set based on the extent the misfire occurs or the air-fuel ratio.

More particularly, the control means 68: detects the misfire in each cylinder of the multi-cylinder engine 2 by means of the misfire calculation means 68a of the misfire detecting means 148 based on the variation of the engine speed and the pressure in the cylinder; calculates the rate of misfire for every 200 revolutions of the engine speed by means of the misfire rate calculation means 68b; and executes the misfire control if the frequency of the misfire detected by the misfire rate calculation means 68b of the misfire detecting means 148 is greater than the predetermined value.

It is noted that the misfire rate is calculated for each cylinder in connection with the catalyst, and the misfire rate is also calculated for each cylinder bank when the multi-cylinder engine 2 is a V-type engine with the catalysts disposed for each cylinder bank.

Figure 5:
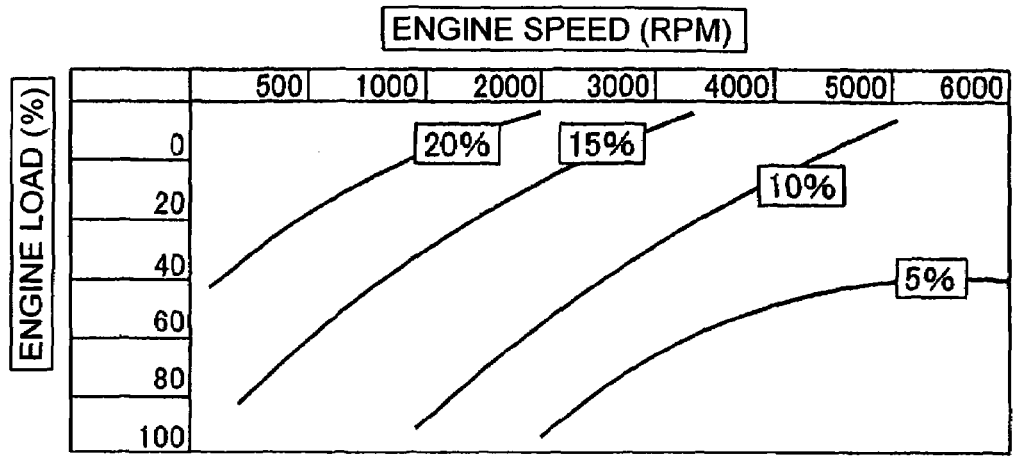
FIG. 5 is a graph to determine the ratio at which the catalyst can be damaged.

As shown in FIG. 5, the predetermined value is a damaging misfire criteria A % that is a ratio at which the catalyst can be damaged. By comparing the misfire rate, i.e., the frequency of the misfire detected by the misfire rate calculation means 68b of the misfire detecting means 148, with the damaging misfire criteria A %, the misfire control is performed when the misfire rate is greater than or equal to the damaging misfire criteria A %.

In misfire control, performed are (1) a fuel cut control for misfire cylinders by the fuel cut means 152 to stop supplying the fuel to the misfiring cylinders, (2) a control to prevent a fuel feed back control and a fuel learning control and to initialize the correction values of both the fuel feed back control and the fuel learning control, and (3) a retard control to retard the ignition timing by a retard quantity set based on the extent the misfire occurs or the air-fuel ratio.

More particularly, the fuel cut means 152 included in the fuel control means 68c performs the fuel cut for the misfire cylinder, and the fuel feed back control is stopped and is initialized. This initialization is to set a correction value at zero or default value.

Also, the fuel control means 68c stops the fuel learning control and the correction value is initialized to an unlearned state. This initialization is to set a correction value for learning at zero or default value. Moreover, the learning control is set at the initial state as in the state at start of the engine and the state for a battery is changed.

Further, the fuel control means 68c prevents the fuel increasing control, e.g., the fuel increases for acceleration, the enrichment, and other factors are prevented.

Furthermore, the ignition timing control means 68d retards the ignition timing by a retard amount set based on the extent of the misfire or the air-fuel ratio. The amount of the retard is set at a fixed value preset by the control means 68 or a value based on the misfire rate or the air-fuel ratio.

If the ignition timing retard control is performed under a knock control, the range of the ignition timing retard for knock is expanded.

Figure 6:
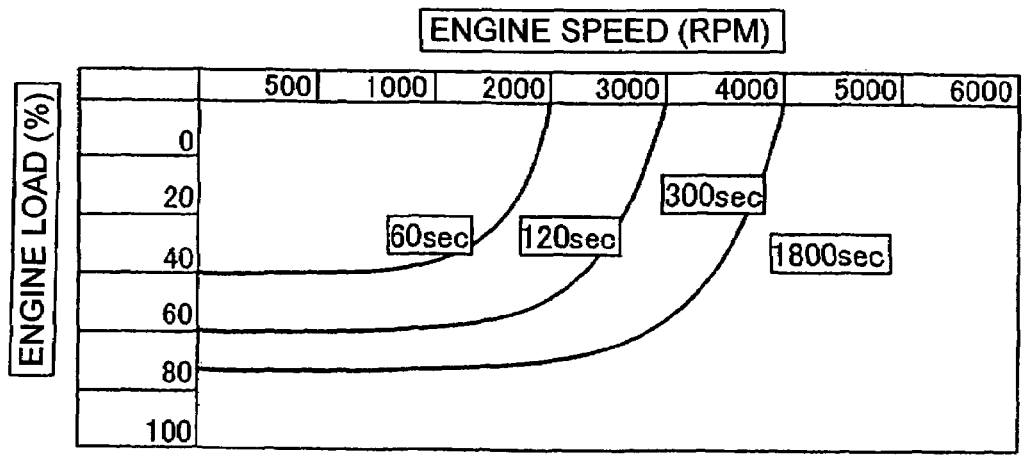
FIG. 6 is a graph showing a condition (Treset) to cancel the fuel cut for misfire.
Figure 7:
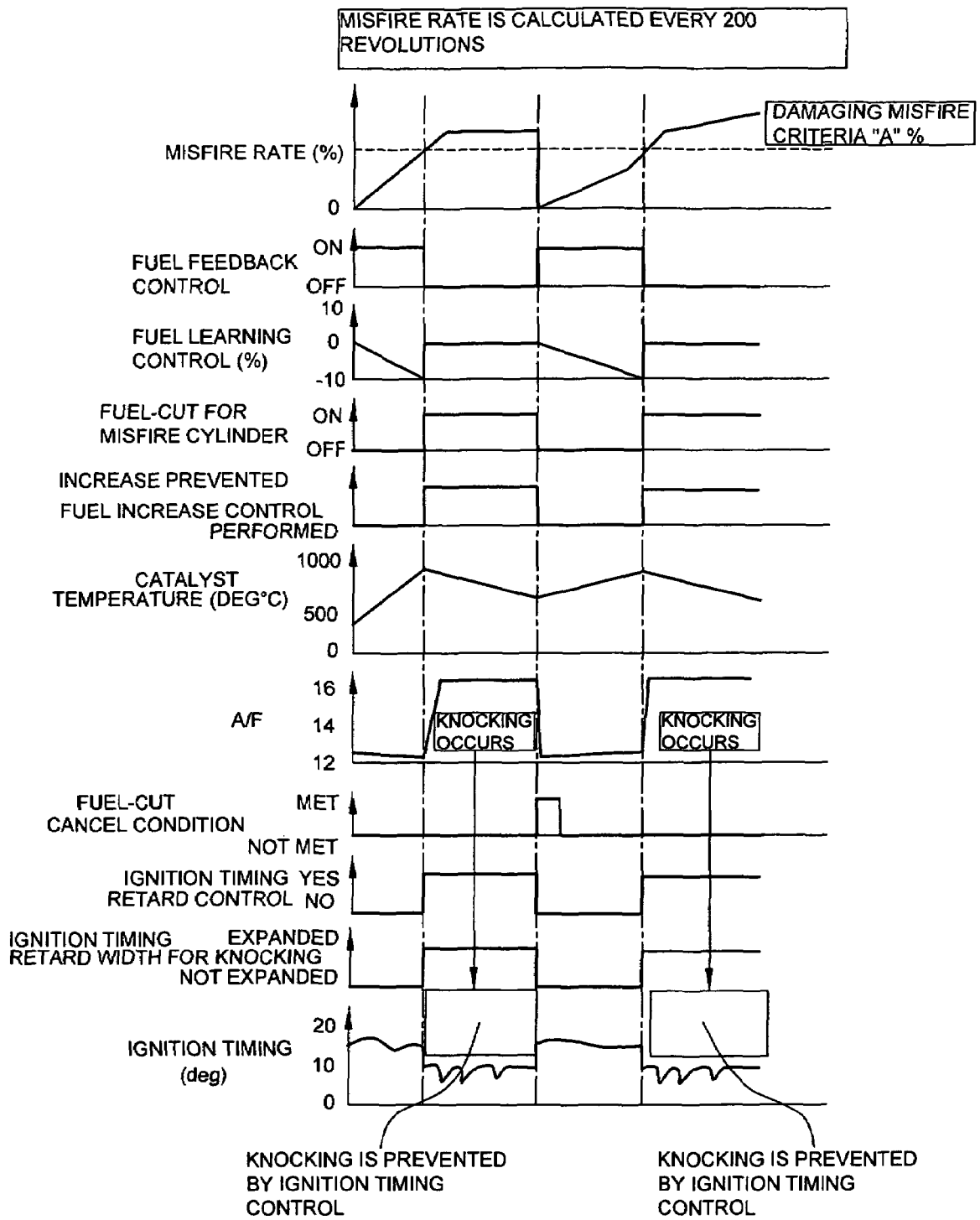
FIG. 7 is a time chart for the controls for misfire such as fuel cut by the misfire detector for the multi-cylinder engine.

After start of the fuel cut control when the misfire occurs, as shown in FIG. 6, a fuel cut cancel condition for misfire is considered to be satisfied when time "Treset" has elapsed and the driving in each divided section continues for more than 60 seconds. Then the fuel cut is canceled and the catalyst protection control is also canceled.

Operation of one embodiment of the present invention is explained with reference to FIG. 1 illustrating a flow chart for the fuel cut control etc. for misfire by the misfire detector 66 of the multi-cylinder engine 2.

A program for fuel cut control for misfire starts in step 102. The rate of misfire for each cylinder is calculated in step 104. In step 106, a determination is made as to whether this misfire rate is greater than or equal to the damaging misfire criteria A at which the catalyst may be damaged.

The rate of misfire is calculated for every 200 revolutions of the engine speed for each cylinder. This calculation includes the cylinder for which the fuel cut is performed. For the V-type engine, the misfire rate is calculated for each cylinder bank. Also, the misfire rate is calculated for each cylinder that shares the catalyst. The damaging misfire criteria A is calculated from a table based on the engine speed and the engine load, as shown in FIG. 5.

In the determination in step 106 as to whether the misfire rate is greater or equal to the damaging misfire criteria A, the fuel cut cylinder is determined from a flow chart for determination of the fuel cut cylinder, as shown in FIG. 2.

In the flow chart for the determination of the cylinder in which the fuel supply should be stopped, a program for determination starts in step 202. Rate of misfire is calculated for each cylinder by dividing the number of misfires by the number of ignitions (for every 200 revolutions of the engine speed) in step 204. In step 206, a determination is made as to whether the misfire rate for each cylinder is greater or equal to the damaging misfire criteria A. In step 208, another determination is made as to whether the number of misfires for each cylinder SIKCYLi (wherein i designates the cylinder number) is greater than a predetermined ratio (e.g. 30%) of the number of the misfires of all cylinders for every 200 revolutions of the engine speed.

If the determination in step 206 and the determination in step 208 both are "YES", then the cylinder for which the fuel cut should be performed is determined in step 210, and the program ends in step 212. If the determination in step 206 or the determination in step 208 is "NO", the process returns to step 204.

After the fuel cut cylinder is determined and when the determination in step 106 is "YES", then the fuel feed back control for the fuel cut cylinder is halted in step 108, and the fuel feed back control is initialized. At this initialization of the fuel feed back control, the correction value is set at zero or a default value.

Then, the learning control of the amount of the fuel feed back control for the fuel-cut cylinder is stopped in step 110. In step 112, the correction value of learning is initialized to an unlearned state. This initialization is to set a correction value for learning at zero or a default value. Also, the learning control is set at the initial state as in the state at start of the engine and the state for the battery is changed.

Then fuel cut is performed for the misfire cylinder in step 114. Prevented is the fuel increase control for the cylinder that the fuel cut is not performed in step 116. In this fuel increase prevention process, the fuel increases for acceleration, enrichment, and other factors are prevented.

In step 118, the ignition timing control means 68d retards the ignition timing. When the ignition timing retard control is performed for the knock control, then the range of ignition timing retard for knock is expanded in step 120. Then a determination is made in step 122 as to whether the fuel cut cancel condition is met.

After start of the fuel cut control when the misfire occurs, as shown in FIG. 6, a fuel cut cancel condition for misfire is considered to be satisfied in step 122 when time "Treset" has elapsed and the driving in each divided section continues for more than 60 seconds. Then the fuel cut is canceled and the catalyst protection control is also canceled.

If the determination in step 122 is "NO", then the program returns to step 104. If the determination in step 122 is "YES", the fuel feed back control is resumed in step 124, and the fuel learn control is resumed in step 126. The fuel increase control prevention is canceled in step 128, and the ignition timing retard control is canceled in step 130. Expansion of the ignition timing retard range is canceled in step 132 if the ignition timing regard control for the knock control is performed. Then the program returns to step 104.

As a result, in the misfire detector 6 for the multi-cylinder engine 2 having the misfire detecting means 148 to detect the misfire for each cylinder, and performing a misfire control if the frequency of the misfire detected by the misfire detecting means 148 is more than a predetermined value, when the misfire control is performed, executed are (1) the fuel cut control for misfiring cylinders by having the fuel cut means 152 stop supplying the fuel to the misfiring cylinders, (2) the control to prevent the fuel feed back control and the fuel learning control and to initialize the correction values of both the fuel feed back control and the fuel learning control, and (3) the retard control to retard the ignition timing by the retard quantity set based on the extent the misfire occurs or the air-fuel ratio. Accordingly, the catalyst is not heated to high temperatures, which prevents detriment or damage of the catalyst.

Figure 8:
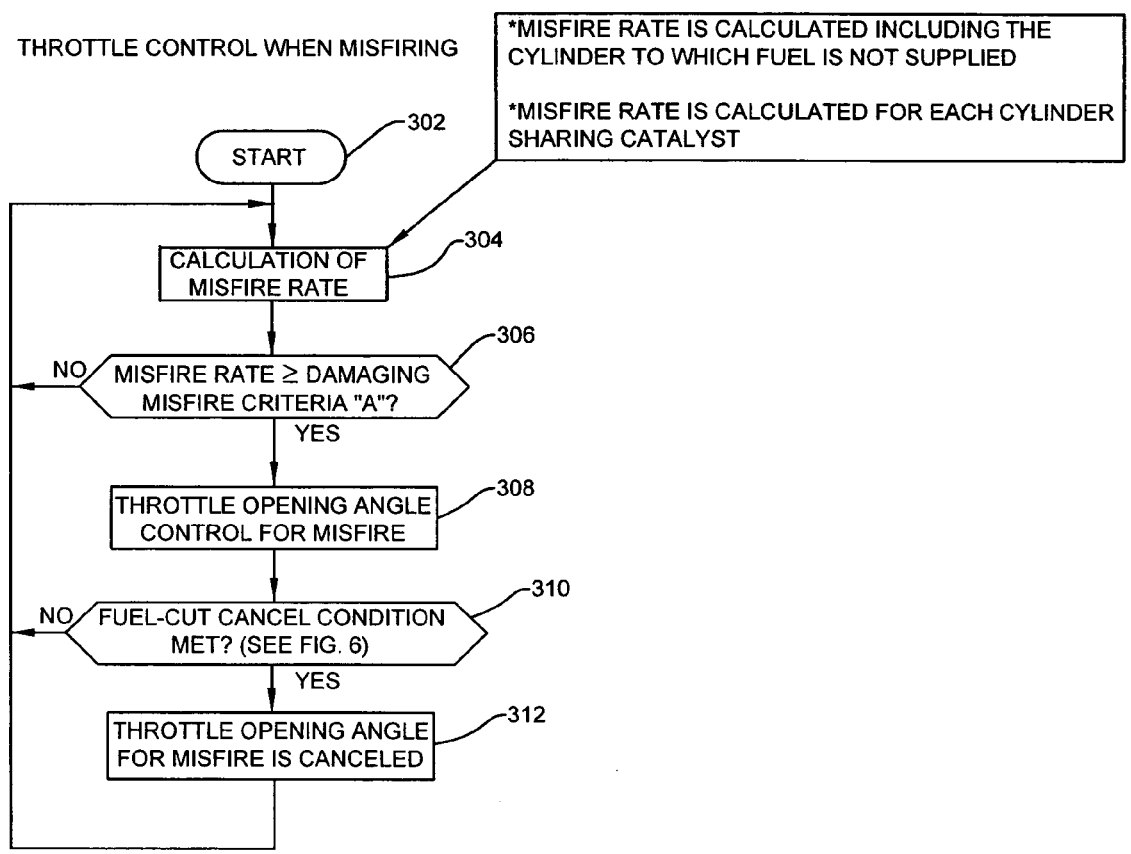
FIG. 8 is a flowchart for control when the misfire occurs such as the fuel cut by the misfire detector for the multi-cylinder engine according to the second embodiment of the present invention.
Figure 9:
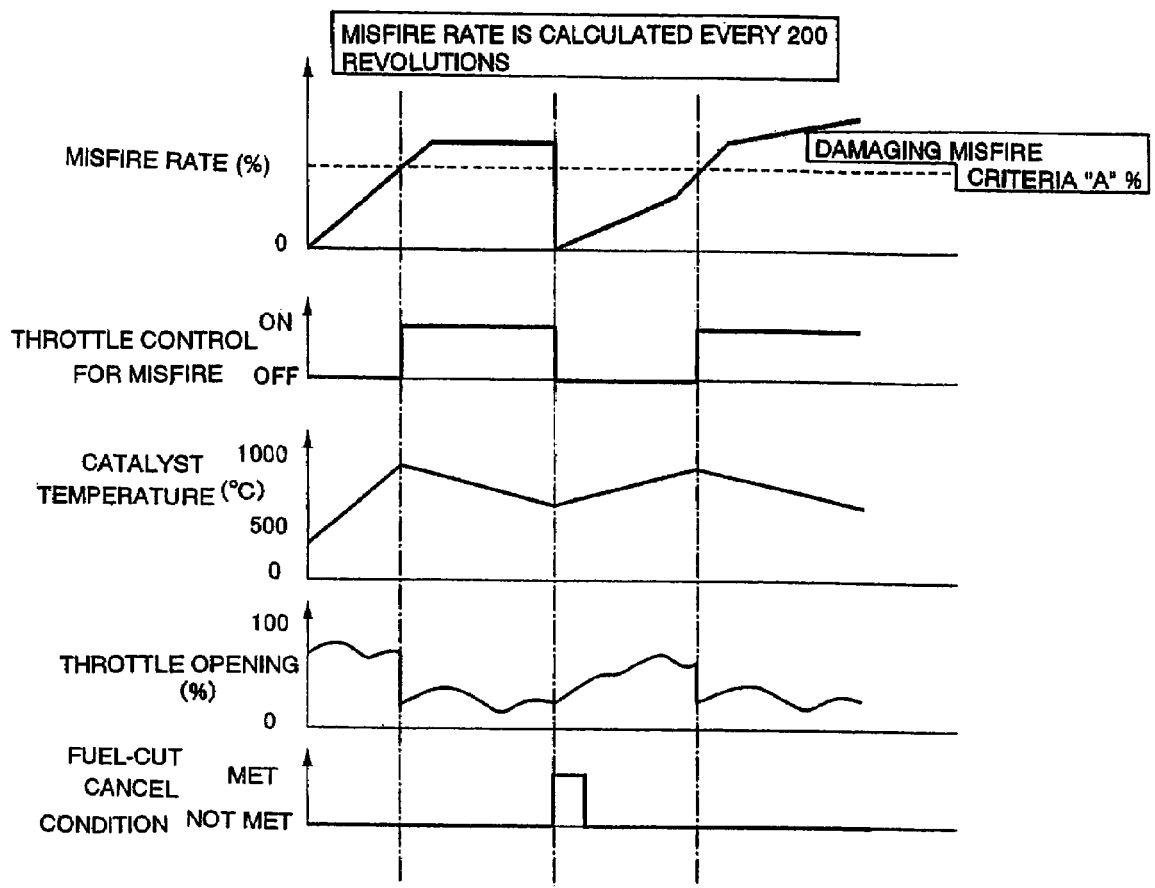
FIG. 9 is a time chart for the throttle control by the misfire detector for the multi-cylinder engine when the misfire occurs.
Figure 10:
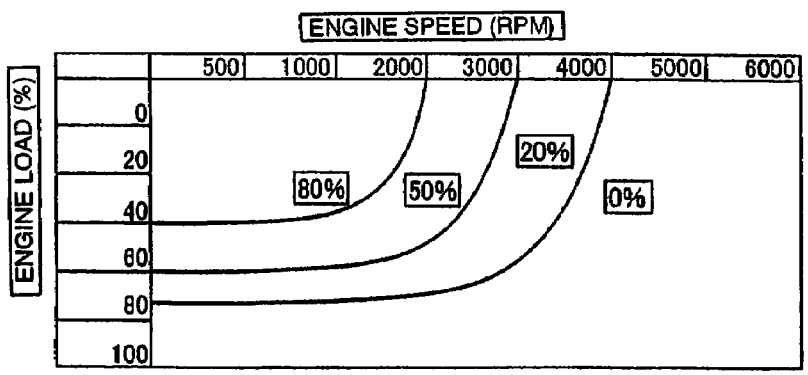
FIG. 10 is a graph showing the throttle opening control THgard when the misfire occurs.

FIGS. 8–10 illustrate a second embodiment of the present invention. The same reference numerals are hereinafter utilized for features identical or similar in function to those described in the first embodiment.

According to the first embodiment of the present invention, in the misfire detector for the multi-cylinder engine, the misfire control performed by the control means includes (1) the fuel cut control for misfiring cylinders by having the fuel cut means 152 stop supplying the fuel to the misfiring cylinders, (2) the control to prevent the fuel feed back control and the fuel learning control and to initialize the correction values of both the fuel feed back control and the fuel learning control, and (3) the retard control to retard the ignition timing by the retard quantity set based on the extent the misfire occurs or the air-fuel ratio. In contrast, the second embodiment is characterized in that in the misfire detector for the multi-cylinder engine, the misfire control performed by the control means includes (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) a throttle opening control for misfire to limit the throttle opening angle as compared to a normal throttle opening in accordance with an acceleration degree.

More particularly, in the second embodiment, the retard of the ignition timing according to the first embodiment based on the extent of the misfire or the air-fuel ratio is replaced by a control regarding the electronic controlled throttle when the misfire is determined.

Operation of the second embodiment is explained with reference to a flowchart of FIG. 8 for throttle control of the misfire detector when misfiring. A program for the throttle control for misfire starts in step 302. The rate of misfire for each cylinder is calculated in step 304. Then a determination is made in step 306 as to whether this misfire rate is greater than or equal to the damaging misfire criteria A at which the catalyst may be damaged.

The rate of misfire is calculated for every 200 revolutions of the engine speed for each cylinder. This calculation includes the cylinder for which the fuel cut is performed. For the V-type engine, the misfire rate is calculated for each cylinder bank. Also, the misfire rate is calculated for each cylinder that shares the catalyst. The damaging misfire criteria A is calculated from a table based on the engine speed and the engine load (see FIG. 5).

In the determination in step 306 as to whether the misfire rate is greater or equal to the damaging misfire criteria A, the cylinder for which the fuel cut should be performed is determined from the flow chart for determination of the fuel cut cylinder shown in FIG. 2.

After the fuel cut cylinder is determined and when the determination in step 306 is "YES" as shown in FIG. 10, the throttle opening angle control for misfire is performed in step 308 so that the throttle opening angle is at a misfire opening angle at which the throttle opening angle is limited with respect to the normal opening angle in accordance with the acceleration opening degree.

Then the fuel cut is performed for the misfiring cylinder. Prevented is the fuel increase control for the cylinder that the fuel cut is not performed. In this fuel increase prevention process, the fuel increases due to the increasing speed, enrichment, and other factors are prevented.

Then a determination is made in step 310 as to whether the fuel cut cancel condition is met. After start of the fuel cut control when the misfire occurs, as shown in FIG. 6, a fuel cut cancel condition for misfire is considered to be satisfied in step 310 when time "Treset" has elapsed and the driving in each divided section continues for more than 60 seconds. Then the fuel cut is canceled and the catalyst protection control is also canceled.

If the determination in step 310 is "NO", then the program returns to step 304. If the determination in step 310 is "YES", the fuel feed back control is resumed and the fuel-learn control is resumed. The fuel increase control prevention is canceled, and the throttle opening angle control for misfire is canceled in step 312. Then the program returns to step 304.

As a result, in the misfire detector for the multi-cylinder engine having the misfire detecting means to detect the misfire for each cylinder, and performing the misfire control if the frequency of the misfire detected by the misfire detecting means is more than the predetermined value, when the misfire control is performed, executed are (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the throttle opening control for misfire to limit the throttle opening angle as compared to the normal opening in accordance with the acceleration degree. Accordingly, when the misfire is detected, avoided is rise in the catalyst temperature owing to the driving at high speed under heavy engine load in a situation where the driver depresses an acceleration pedal when he feels power down due to the misfires. This prevents detriment or damage of the catalyst.

Figure 11:
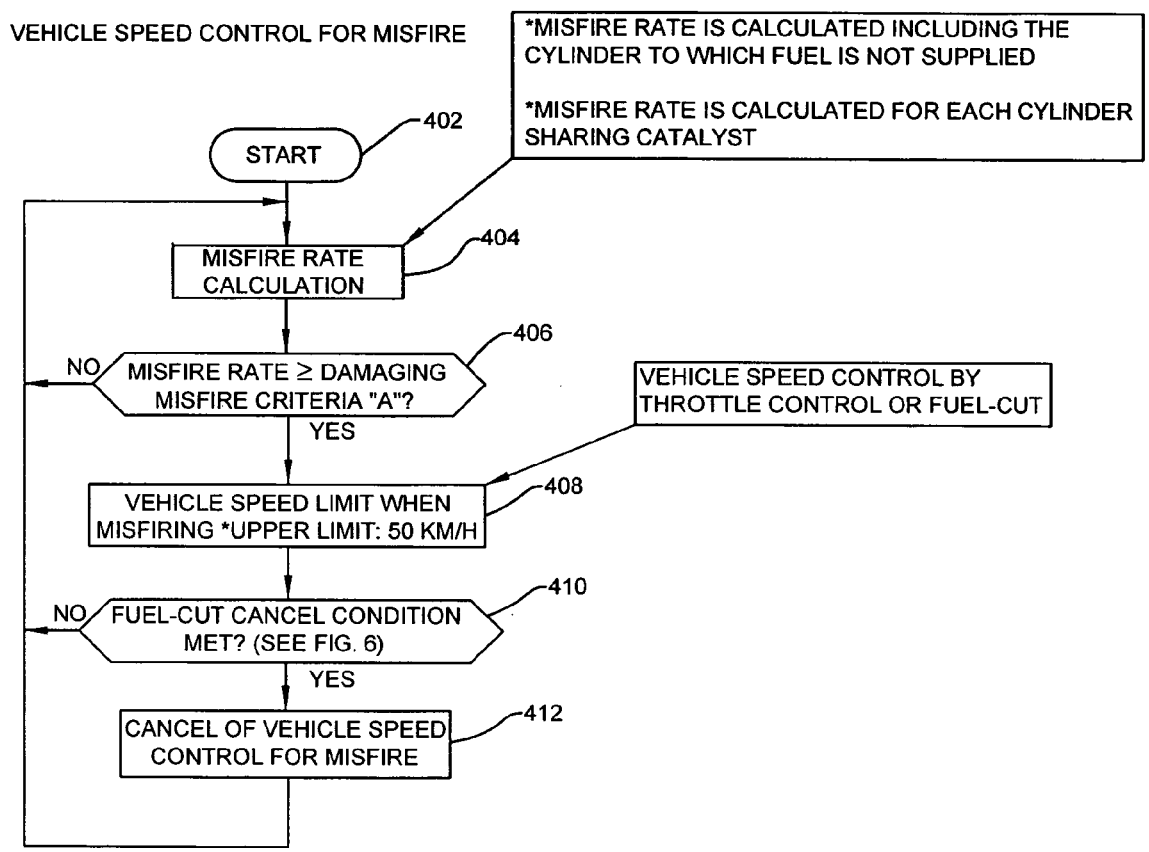
FIG. 11 is a flowchart for control when the misfire occurs such as the fuel cut by the misfire detector for the multi-cylinder engine according to the third embodiment of the present invention.
Figure 12:
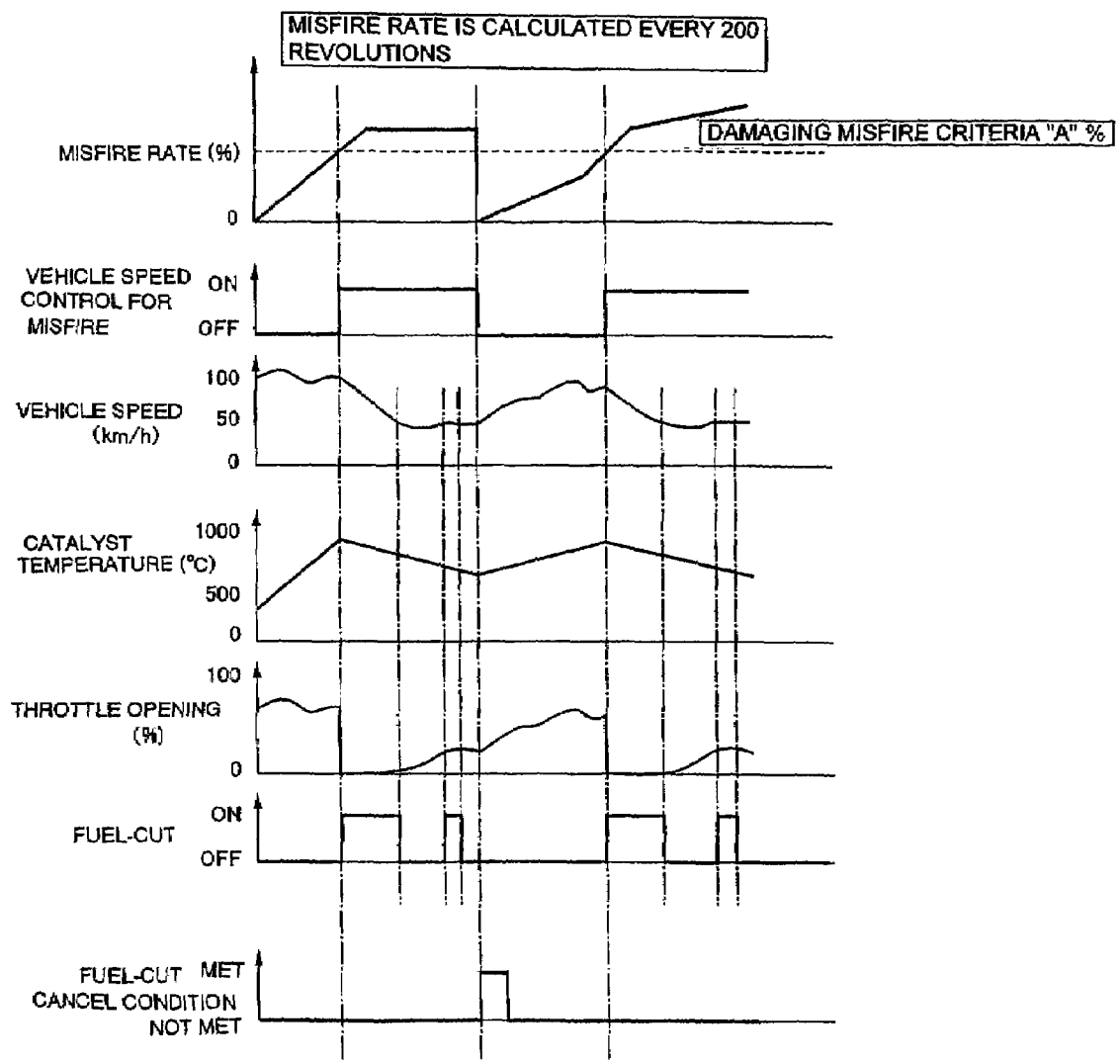
FIG. 12 is a time chart for the vehicle speed limit control by the misfire detector for the multi-cylinder engine when the misfire occurs.
Figure 13:
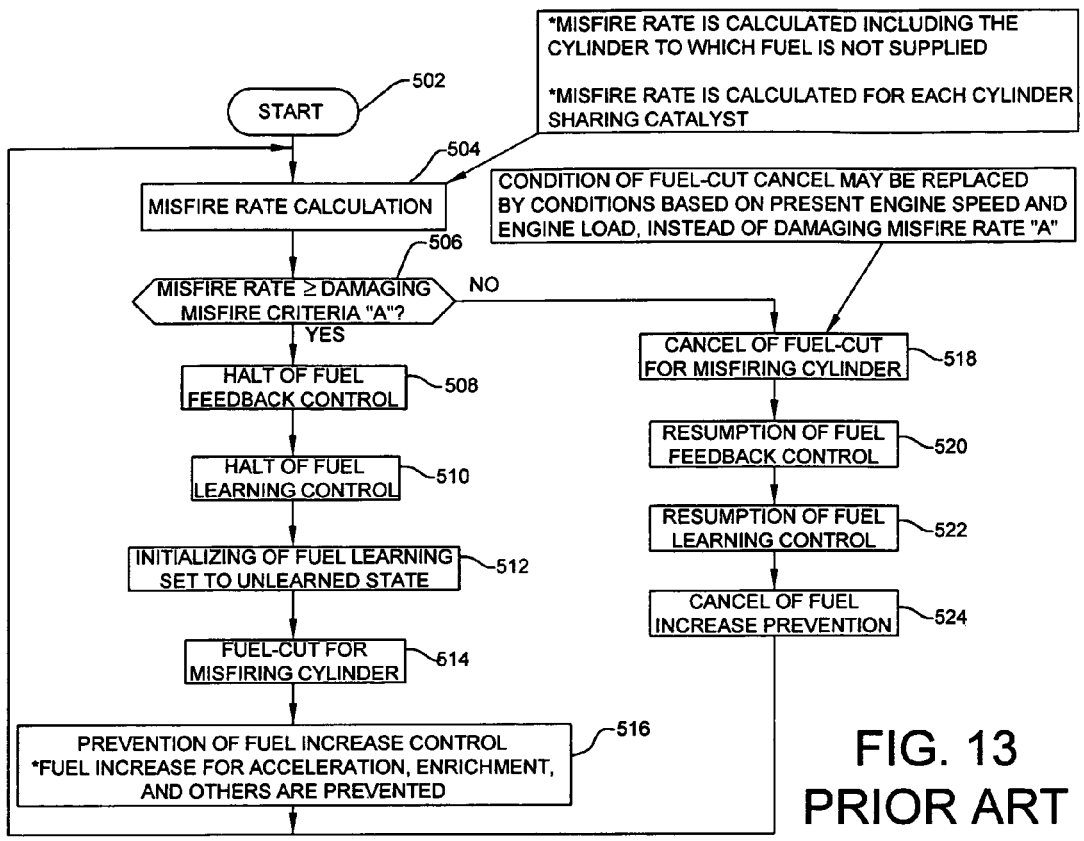
FIG. 13 is a flow chart for the controls for misfire such as fuel cut by the misfire detector for the multi-cylinder engine according to the prior art.
Figure 14:
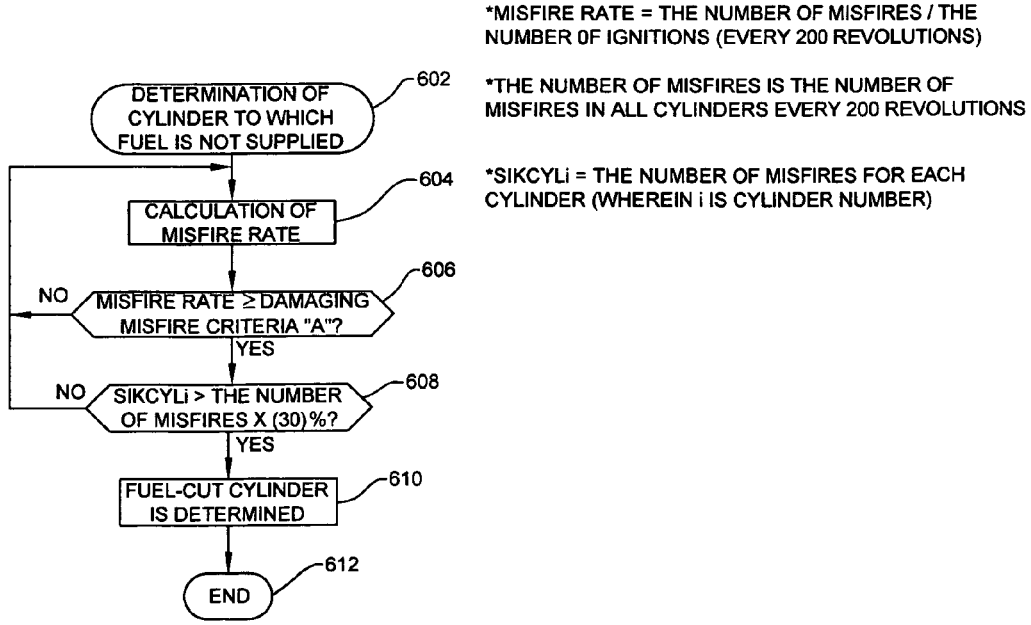
FIG. 14 is a flow chart to determine the cylinder for which the fuel cut should be performed.
Figure 15:
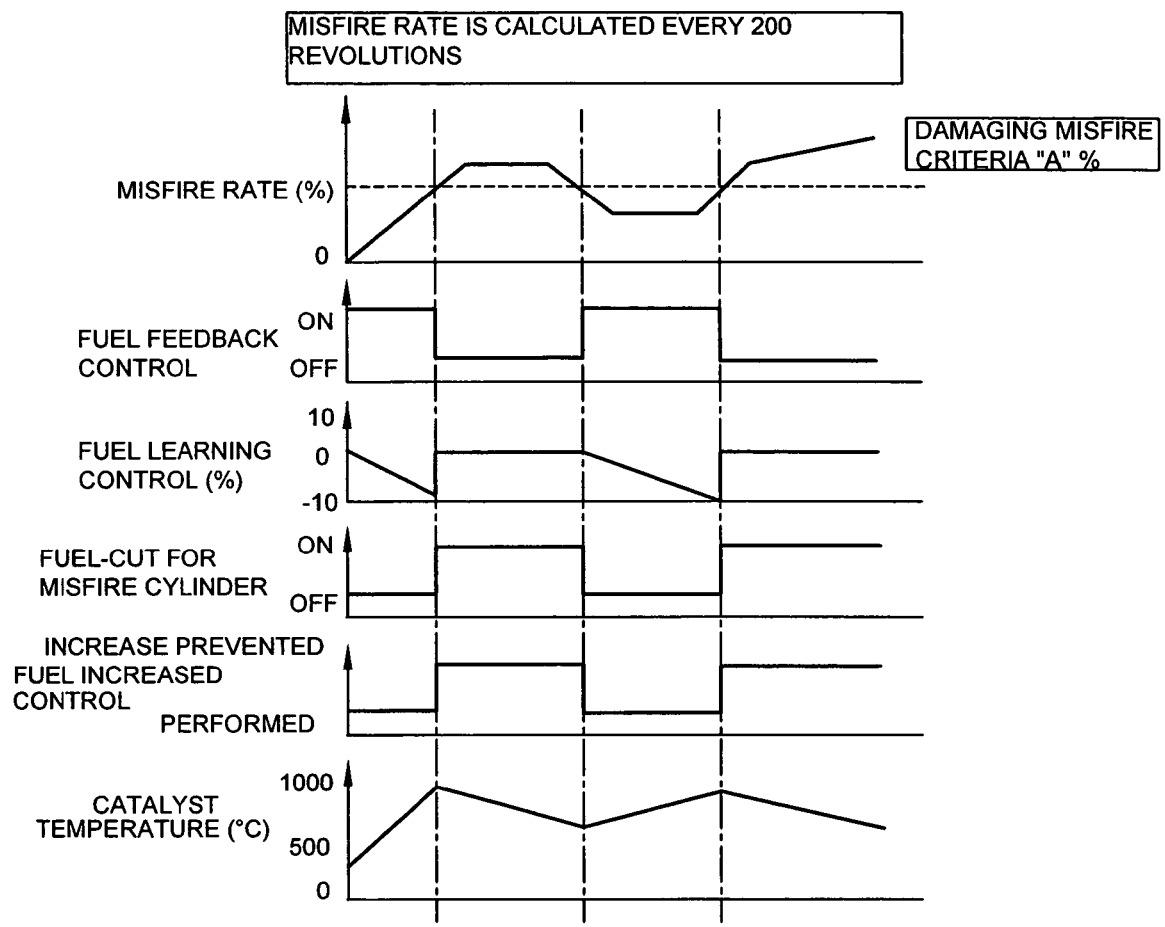
FIG. 15 is a time chart for the controls when the misfire occurs such as the fuel cut by the misfire detector for the multi-cylinder engine according to the first embodiment of the present invention.

FIGS. 11 and 12 illustrate a third embodiment of the present invention.

The third embodiment of the present invention is characterized in that in the misfire detector for the multi-cylinder engine, the misfire control includes (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) an engine speed control to limit the engine speed below a predetermined engine speed irrespective of the opening degree of the throttle. Alternatively, the third embodiment of the present invention is characterized in that in the misfire detector for the multi-cylinder engine, the misfire control includes (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) a vehicle speed control to limit the vehicle speed below a predetermined speed irrespective of the opening degree of the throttle.

More particularly, according to the third embodiment, the engine speed control limits the engine speed below the predetermined engine speed irrespective of the opening degree of the throttle, or the vehicle speed control limits the vehicle speed below the predetermined vehicle speed irrespective of the opening degree of the throttle, instead of the ignition timing retard control based on the extent of the misfire or the air-fuel ratio according to the first embodiment, or the electric controlled throttle control for misfire according to the second embodiment.

Operation of the third embodiment is explained with reference to a flowchart of FIG. 11 for the vehicle speed limit control of the misfire detector when misfiring. A program for the vehicle speed limit control for misfire starts in step 402. The rate of misfire for each cylinder is calculated in step 404. Then a determination is made in step 406 as to whether this misfire rate is greater than or equal to the damaging misfire criteria A at which the catalyst may be damaged.

The rate of misfire is calculated for every 200 revolutions of the engine speed for each cylinder. This calculation includes the cylinder for which the fuel cut is performed. For the V-type engine, the misfire rate is calculated for each cylinder bank. Also, the misfire rate is calculated for each cylinder that shares the catalyst. The damaging misfire criteria A is calculated from a table based on the engine speed and the engine load (see FIG. 5).

In the determination in step 406 as to whether the misfire rate is greater or equal to the damaging misfire criteria A, the cylinder for which the fuel cut should be performed is determined from the flow chart for determination of the fuel cut cylinder shown in FIG. 2.

After the fuel cut cylinder is determined and when the determination in step 406 is "YES", then the vehicle speed is limited below the predetermined speed, i.e., the vehicle speed limit control for misfire, irrespective of the opening of the throttle in step 408. In the vehicle speed control by the throttle control or the fuel cut control, the predetermined speed is, e.g., 50 km/h, so that the vehicle speed is limited below 50 km/h irrespective of the opening degree of the throttle.

Prevented is the fuel increase control for the cylinder that the fuel cut is not performed. In this fuel increase prevention process, fuel increases due to the increasing speed, enrichment, and other factors are prevented.

Then a determination is made in step 410 as to whether the fuel cut cancel condition is met. After start of the fuel cut control when the misfire occurs as shown in FIG. 6, a fuel cut cancel condition for misfire is considered to be satisfied in step 410 when time "Treset" has elapsed and the driving in each divided section continues for more than 60 seconds. Then the fuel cut is canceled and the catalyst protection control is also canceled.

If the determination in step 410 is "NO", then the program returns to step 404. If the determination in step 410 is "YES", the fuel feed back control is resumed and the fuel-learn control is resumed. The fuel increase control prevention is canceled, and the throttle opening angle control for misfire is canceled in step 412. Then the program returns to step 404.

As a result, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfiring cylinders by having the fuel cut means stop supplying the fuel to the misfiring cylinders, (2) a control to prevent the fuel feed back control and the fuel learning control and to initialize the correction values of both the fuel feed back control and the fuel learning control, and (3) the engine speed control to limit the engine speed below the predetermined engine speed irrespective of the opening degree of the throttle. Accordingly, when the misfire is detected, a rise is avoided in the catalyst temperature owing to the driving at high speed under heavy engine load in a situation where the driver depresses the acceleration pedal when he feels power down due to the misfires. This prevents detriment or damage of the catalyst.

Furthermore, in the misfire detector for the multi-cylinder engine having the misfire detecting means to detect the misfire for each cylinder, and performing the misfire control if the frequency of the misfire detected by the misfire detecting means is more than the predetermined value, the misfire control includes (1) the fuel cut control for misfiring cylinders by having the fuel cut means stop supplying the fuel to the misfiring cylinders, (2) the control to prevent the fuel feed back control and the fuel learning control and to initialize the correction values of both the fuel feed back control and the fuel learning control, and (3) the vehicle speed control to limit the vehicle speed below the predetermined speed irrespective of the opening degree of the throttle. Accordingly, when the misfire is detected, the driver is prevented from driving at high speed which is contrary to the misfire control for avoiding problems due to the misfires. Thereby, the catalyst is not heated to high temperatures, which prevents detriment or damage of the catalyst.

The present invention is not limited to the above-mentioned first, second, and third embodiments, but is adaptable for various applications and variations or modifications.

For example, in the above-mentioned embodiments of the present invention, when the misfire control is executed, in addition to two controls, i.e., (1) the fuel cut control for misfiring cylinders by the fuel cut means to stop supplying the fuel to the misfiring cylinders, and (2) the control to prevent the fuel feed back control and the fuel learning control and to initialize the correction values of both the fuel feed back control and the fuel learning control, the third control includes (3) the retard control to retard the ignition timing by the retard quantity set based on the extent the misfire occurs or the air-fuel ratio, (3) the throttle opening control for misfire to limit the throttle opening angle as compared to the normal opening in accordance with the acceleration degree, (3) the engine speed control to limit the engine speed below the predetermined engine speed irrespective of the opening degree of the throttle, or (3) the vehicle speed control to limit the engine speed below the predetermined speed irrespective of the opening degree of the throttle. However, the third control may be combined as a special configuration.

When implementing the misfire control, in addition to two controls, i.e., (1) the fuel cut control for misfiring cylinders by having the fuel cut means stop supplying the fuel to the misfiring cylinders, and (2) the control to prevent the fuel feed back control and the fuel learning control and to initialize the correction values of both the fuel feed back control and the fuel learning control, as the third control, combined can be (3) the retard control to retard the ignition timing by the retard quantity set based on the extent the misfire occurs or the air-fuel ratio and (3) the throttle opening control for misfire to limit the throttle opening angle as compared to the normal throttle opening, in accordance with the acceleration degree, for example.

This contributes the improvement of the reliability of the misfire control, so that the catalyst is prevented from being heated to high temperatures with reliability in order to avoid detriment or the damage of the catalyst.

What is claimed is:

1. A misfire detector for a multi-cylinder engine having a misfire detecting means to detect the misfire for each cylinder, and performing a misfire control if the frequency of the misfire detected by the misfire detecting means is more than a predetermined value,
   wherein the misfire control includes:
   a fuel cut control for misfiring cylinders by a fuel cut means to stop supplying the fuel to the misfiring cylinders,
   a control to prevent a fuel feed back control and a fuel learning control and to initialize the correction values of both the fuel feed back control and the fuel learning control, and
   a retard control to retard the ignition timing by a retard quantity set based on the extent the misfire occurs or the air-fuel ratio.

2. A misfire detector for a multi-cylinder engine having a misfire detecting means to detect the misfire for each cylinder, and performing a misfire control if the frequency of the misfire detected by the misfire detecting means is more than a predetermined value,
   wherein the misfire control includes:
   a fuel cut control for misfiring cylinders by a fuel cut means to stop supplying the fuel to the misfiring cylinders,
   a control to prevent a fuel feed back control and a fuel learning control and to initialize the correction values of both the fuel feed back control and the fuel learning control, and
   a throttle opening control for misfire to limit the throttle opening angle as compared to a normal throttle opening angle.

3. A misfire detector for a multi-cylinder engine having a misfire detecting means to detect the misfire for each cylinder, and performing a misfire control if the frequency of the misfire detected by the misfire detecting means is more than a predetermined value,
   wherein the misfire control includes:
   a fuel cut control for misfiring cylinders by a fuel cut means to stop supplying the fuel to the misfiring cylinders,
   a control to prevent a fuel feed back control and a fuel learning control and to initialize the correction values of both the fuel feed back control and the fuel learning control, and
   an engine speed control to limit the engine speed below a predetermined engine speed irrespective of the opening degree of the throttle.

4. A misfire detector for a multi-cylinder engine having a misfire detecting means to detect the misfire for each cylinder, and performing a misfire control if the frequency of the misfire detected by the misfire detecting means is more than a predetermined value,
   wherein the misfire control includes:
   a fuel cut control for misfiring cylinders by a fuel cut means to stop supplying the fuel to the misfiring cylinders,
   a control to prevent a fuel feed back control and a fuel learning control and to initialize the correction values of both the fuel feed back control and the fuel learning control, and
   a vehicle speed control to limit the vehicle speed below a predetermined speed irrespective of the opening degree of the throttle.

* * * * *